US006728030B2

(12) United States Patent
Bellefuil

(10) Patent No.: US 6,728,030 B2
(45) Date of Patent: Apr. 27, 2004

(54) ELECTRONIC BINOCULARS HAVING A SINGLE DISPLAY

(76) Inventor: David Bellefuil, 4186 Creekside Pass, Zionsville, IN (US) 46077

( * ) Notice: Subject to any disclaimer, the term of this patent is extended or adjusted under 35 U.S.C. 154(b) by 95 days.

(21) Appl. No.: 09/904,957

(22) Filed: Jul. 13, 2001

(65) Prior Publication Data

US 2002/0008905 A1 Jan. 24, 2002

Related U.S. Application Data

(63) Continuation-in-part of application No. 09/426,217, filed on Oct. 22, 1999, now abandoned.

(51) Int. Cl.[7] ........................... G02B 23/00; G02B 27/22
(52) U.S. Cl. ........................ 359/407; 359/409; 359/480
(58) Field of Search ................................. 359/362–363, 359/399, 405, 407–410, 808–812, 480–482

(56) References Cited

U.S. PATENT DOCUMENTS

| 3,701,582 A | * | 10/1972 | Koch ........................... 359/480 |
| 3,741,634 A | * | 6/1973 | Stoltze ......................... 351/57 |
| 4,561,723 A | * | 12/1985 | Hamano et al. ............... 349/15 |
| 4,568,081 A | | 2/1986 | Martin .......................... 273/65 |
| 4,571,628 A | | 2/1986 | Thornton ..................... 358/224 |
| 4,676,619 A | | 6/1987 | Woolley ....................... 396/434 |
| 4,969,647 A | | 11/1990 | Mical et al. ................... 273/85 |
| 4,976,429 A | | 12/1990 | Nagel ............................. 273/1 |
| 5,221,992 A | * | 6/1993 | Park ............................. 359/504 |
| 5,255,120 A | * | 10/1993 | Anzai et al. ................. 359/511 |
| 5,359,428 A | | 10/1994 | Kubota et al. ............... 358/335 |
| 5,579,165 A | | 11/1996 | Michel et al. ............... 359/407 |
| 5,581,399 A | | 12/1996 | Abe ............................. 359/407 |
| 5,726,755 A | | 3/1998 | Wolff ........................... 356/364 |
| 5,729,016 A | | 3/1998 | Klapper et al. .............. 250/334 |
| 5,729,382 A | | 3/1998 | Morita et al. ................ 359/376 |
| 5,737,131 A | | 4/1998 | Palmer ......................... 359/819 |
| D399,882 S | | 10/1998 | Bagley et al. ................ D21/13 |
| 5,847,868 A | | 12/1998 | Palmer ......................... 359/407 |
| 5,861,994 A | | 1/1999 | Kelly ........................... 359/630 |
| 5,940,171 A | | 8/1999 | Tocher ........................... 356/12 |
| 5,963,369 A | | 10/1999 | Steinthal et al. ............. 359/410 |
| 6,088,053 A | | 7/2000 | Hammack et al. ............ 348/61 |
| 6,255,650 B1 | * | 7/2001 | Warner et al. ............... 250/330 |

FOREIGN PATENT DOCUMENTS

| AU | 116270 | 12/1942 | .................. 359/600 |
| DE | 1047378 | 12/1958 | .................. 259/600 |
| GB | 17697 | 11/1895 | .................. 359/600 |

OTHER PUBLICATIONS

Digital Binoculars, Home Page, Stereo Vision Imaging, Inc., www.stereovisioninc.com, pg. 1 of 1.
Digital Binoculars, Product Description, Features Benefits, www.stereovisioninc.com, pg. 1 of 1.
Digital Binoculars, FAQ's, www.stereovisioninc.com, pg. 1 of 1.
Sony Handicam CCD–TRV46 (camcorder—used for camera and zoom with display and electronics in prototype in applicant's drawings).
Radica Sub Assault Model 4001 (video game—used for rear lens and body of prototype in applicant's drawings).

* cited by examiner

*Primary Examiner*—Thong Nguyen
(74) *Attorney, Agent, or Firm*—Woodard, Emhardt, Moriarty, McNett & Henry LLP

(57) ABSTRACT

Electronic binoculars comprise a body containing an electronic camera having an electromechanical zoom, a single display, a power source, and electronics for modifying the output of the camera, including a variable electronic zoom. A lens is positioned between the user's eyes and the display to further magnify the image. External controls toggle power and select modifications to the image to be performed by the electronics.

30 Claims, 3 Drawing Sheets

ELECTRONIC BINOCULARS HAVING A SINGLE DISPLAY

This application is a continuation-in-part of pending U.S. patent application Ser. No. 09/426,217, filed Oct. 22, 1999, now abandoned.

BACKGROUND OF THE INVENTION

The present invention relates generally to apparati for improved distance viewing, and more particularly to binoculars using electronic processing to display an image.

Binoculars are used to magnify the user's vision, to permit an apparently closer view of the object or scene of interest, such as birds or other animals, sporting events, etc. Typically, binoculars have comprised two barrels, each containing glass object and eyepiece lenses, glass prisms, and focusing mechanisms, such as those described in U.S. Pat. No. 5,777,785 to Ishikawa. Binoculars constructed this way are heavy, because of the volume of glass needed for all the lenses and prisms, and are expensive, because of the cost of precision-ground optical elements. Alternative materials lighter than glass are available, such as high precision plastic, but can be more expensive, and can add chromatic aberrations. Furthermore, prior binoculars can be uncomfortable, because some must either be held away from the face, making them difficult to hold in a constant position relative to the eyes, or make contact with the face in the eye sockets. Moreover, binoculars typically require adjustment of the distance between two sight paths to make it appear to both eyes that they are viewing the same image. Still further, in order to have a really bright image, conventional binoculars require large optics to collect more light. Even further, the magnification in binoculars causes small movements in the binoculars to produce correspondingly larger displacement in the image, interfering with the view of desired object or scene. Furthermore, some binoculars known in the art provide only a discreet set of magnifications. Their lenses must be exchanged in order to change magnification, at least briefly interrupting the view. This also limits the users options for selecting the best magnification for viewing a particular object or scene.

Thus, there is a need for binoculars which are lighter weight than those typically found in the art, which can make contact with the face in a way that is simultaneously more stable and more comfortable, and which does not restrict the image to a finite number of magnifications, and do not interrupt the view when switching between magnifications. The present invention is directed towards meeting these needs.

SUMMARY OF THE INVENTION

In accordance with the present invention, electronic binoculars are provided comprising a hollow body having a pair of apertures, and containing an electronic camera having an output connected to a single display device, in which the camera observes objects or images through the distal aperture, and the user views the display device with both eyes through the proximal aperture.

In one form of the present invention, the body is shaped to make firm contact with the face of the user at a number of places other than the eye sockets, and preferably in a continuous strip above the eyes and two strips below the eyes on each side of the nose. In this form of the invention, there are ideally points of contact above and below, and to the left and right of the user's eyes, in order to minimize the amount of small, undesired movement of the binoculars. Not only does this create a substantially more stable image, it assures that what small movements exist will track the small movements of the user's head. Because the user's brain already corrects for small movements of the head in order stabilize normal vision, matching the movements of the binoculars to the user's head improves the apparent stability of the image.

In another form of the present invention, a lens is positioned in the proximal aperture to provide a further-enlarged view of the display device. Moreover, the device has space between this lens and the user's eyes which is large enough to accommodate conventional eyeglasses, thus allowing each user to retain his optimized optical correction while using the binoculars.

In yet anther form of the invention, the user can control the electronics with external buttons, slides, or other such devices, in order to modify the output of the camera in one or more predefined ways, such as providing both mechanical and electronic zoom capabilities.

One object of the present invention is to provide lightweight electronic binoculars. Other objects and advantages of the present invention will be apparent from the following description.

DESCRIPTION OF THE PREFERRED EMBODIMENT

Figure 1B:
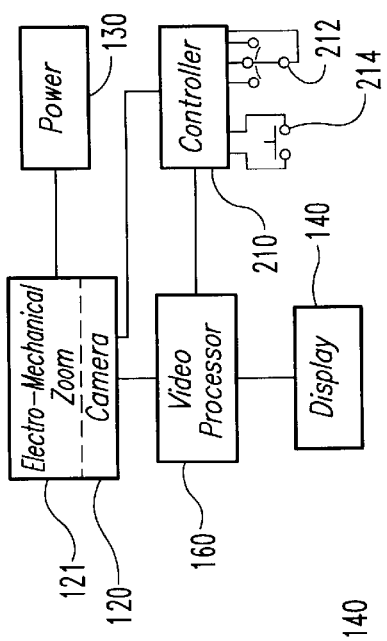
FIG. 1b is a block diagram of certain elements of the electronic binoculars of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described processes, systems, or devices, and any further applications of the principles of the invention as described herein are contemplated as would normally occur to one skilled in the art to which the invention relates.

The present invention can provide electronic binoculars that provide a stable viewing image, that are comfortable and easy to use, and are light. The preferred embodiment electronic binoculars weigh less than three pounds. In addition, the present invention provides electronic binoculars that have a continuous range of zoom options, and which do not interrupt the view when switching between magnifications.

Figure 1A:
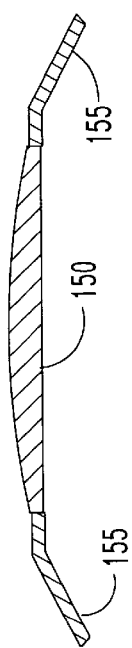
FIG. 1a is an enlarged cross-section of the rear lens of the electronic binoculars of FIG. 1.
Figure 1:
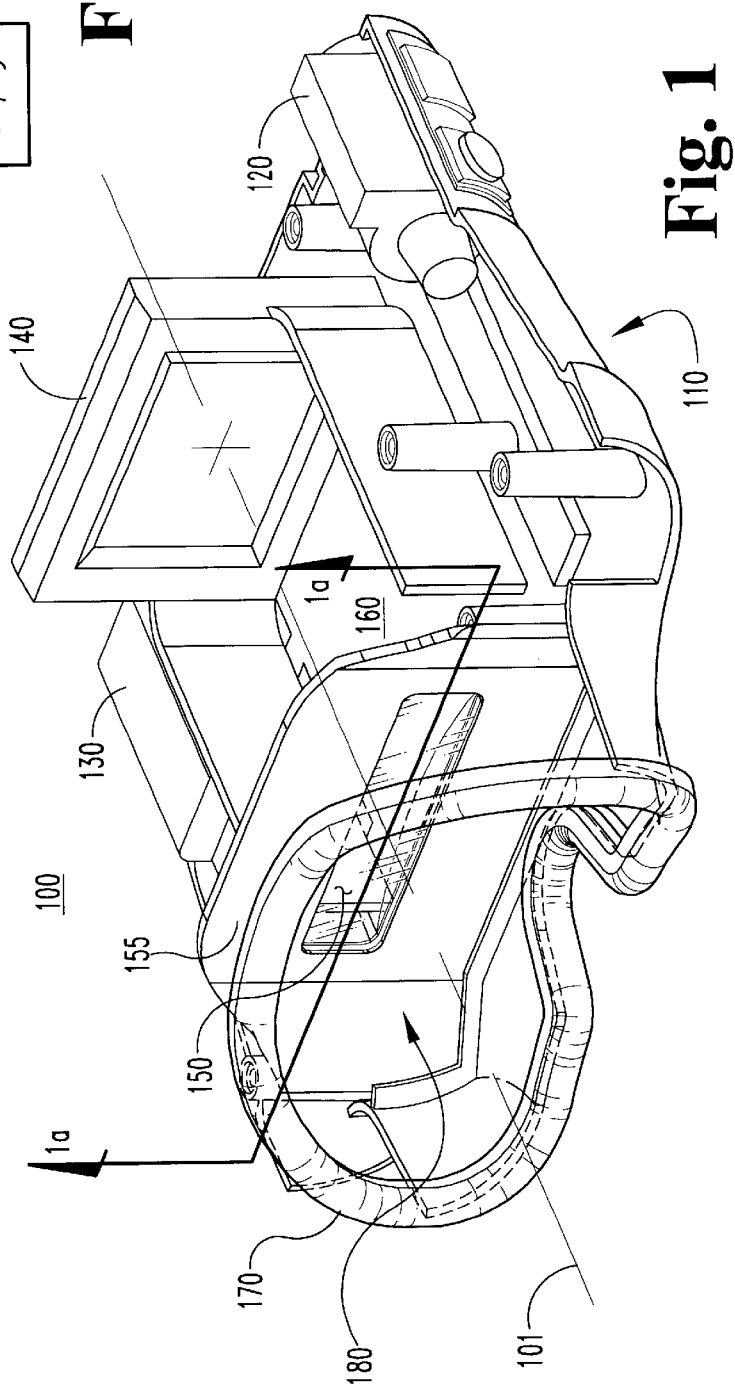
FIG. 1 is a three-quarters perspective view of electronic binoculars embodying the present invention with the top portion of the body removed to reveal the interior.

FIG. 1 shows electronic binoculars 100 with an upper portion (shown as 310 in FIG. 3) of a body 110 removed to reveal an interior. The body 110 defines a proximal aperture 180, and a distal aperture (shown as 280 in FIG. 2). The proximal aperture 180 is preferably at least 4 centimeters wide. A contact portion 170 is located at one end of the body 110. A self-focusing camera 120, such as are used in camcorders, is positioned on one side of the interior of the body 110, and is affixed thereto. The camera can both electro-mechanically and electronically zoom the image. Preferably, the binocular body is water resistant. A power supply 130 is preferably affixed in a position on the other side of body 110 in order to center the binoculars' 100 center of gravity along an axis 101. Preferably, the power source 130 is a rechargeable battery such as those commonly used in portable electronic equipment. Alternatively, the power source 130 could be one or more disposable batteries. In certain embodiments, the power source 130 is external, adapted to be worn on a belt or otherwise carried on the user's person, and connected to the binoculars 100 by an electrical cord.

A display 140 is positioned vertically within the body, at the end opposite the contact portion 170, and facing it. In the preferred embodiment, the display is an active matrix screen. Alternatively, the display may be an LCD, plasma discharge, digital light processor, or any other energy efficient display. The binoculars could additionally be modified by incorporating solar cells (not shown) in the upper body of the binoculars to power the electronics, to reduce or eliminate the rechargeable battery, or to provide automatic recharging.

In these embodiments, the body 110 is preferably opaque, so as to make the interior relatively dark, thereby reducing the required amount of power consumption necessary to make the display clearly visible. A magnifying lens 150 is affixed vertically near the contact portion 170. Preferably, the lens 150 is at least 4 cm wide, composed of high-precision, high index-of-refraction plastic. Alternatively, the lens 150 can be composed of glass, crystal, or other suitable light-refracting material. The lens 150 may be radially symmetrically convex about a normal axis, or may be convex about only one of three orthogonal reference angles. The lens 150 is held in position by a frame 155. A circuit board 160 is in electronic communication with the camera 120 and the display 140, and preferably lays horizontally in the bottom of body 110. The circuit board 160 may be positioned elsewhere within the body 110 that is out of the path between the display 140 and the lens 150. Preferably, the lens 150 is wide enough to permit both eyes of the user to view the display 140 through the lens 150 while the contact portion 170 is in contact with the user's face. Also preferably, the lens 150 is rectangular, to reduce cost and weight while retaining adequate width. The circuit board 160 is such as are well known in the art, and is designed to function as a video processor, and to handle the commands from the slider switch 212 to the zoomable camera as is further described herein.

The magnifying lens 150 can have a normal, radially symmetric, curvature, despite it's non-circular shape. Alternatively, the lens 150 can be convex about only one axis. That is, rather than having a single point as the center of curvature for a given face, a surface of the lens 150 may have a linear axis as the center of curvature. Thus, in certain embodiments, the convex lens is convex about a single reference axis. In these embodiments, the reference axis is preferably a vertical axis.

The body of the electronic binocular rearward of frame 155 in which lens 150 is mounted forms a hood which terminates in contact portion 170. As can be seen in FIG. 1, the horizontal center of the top of this hood extends rearward from said proximal aperture 180 at least a distance which is as great as the height of this aperture 180 in which the lens 150 is located, and portions of the hood extend rearward at least about twice the height of this aperture 180.

In the preferred embodiment, the use of the single rectangular lens for both eyes to view the display allows a purely refractive path that has no reflective mirror for the image of the device, in which one eye of said user can simultaneously view substantially the same portion of said display device that the other eye is viewing through said proximal aperture when said user places said hood element against said user's face In certain embodiments a VCR or other suitable recording device could be connected to the camera 120. Such a recording device could either be contained within the body 110 (if it is sufficiently small and light), or could be carried remotely, for example in a backpack or on a belt, and connected by wire through a jack, or a wireless transmission device. See, for example, U.S. Pat. Nos. 5,963,369 and 5,359,428, 6,088,053 which are hereby incorporated herein in their entireties. However, in the preferred embodiment, for optimum weight, cost, and reliability the camera 120 connects only to the single electronic display device, and thus has no external video jack.

A circuit board 160 is in electronic communication with the camera 120 and the display 140, and preferably lays horizontally in the bottom of body 110. The circuit board 160 may be positioned elsewhere within the body 110 that is out of the path between the display 140 and the lens 150. Preferably, the lens 150 is wide enough to permit both eyes of the user to view the display 140 through the lens 150 while the contact portion 170 is in contact with the user's face. Also preferably, the lens 150 is rectangular, to reduce cost and weight while retaining adequate width. The circuit board 160 is such as are well known in the art, and is designed to function as a video processor, and to handle the commands from the slider switch 212 to the zoomable camera as is further described herein.

FIG. 1a shows a cutaway perspective illustrating a convex shape of the lens 150. When the user views the display 140 through the lens 150 the apparent angular size of the display 140 increased, causing it to appear to be larger to the user's eyes. Reference arrows 1a in FIG. 1 indicate the location of the cross section illustrated in FIG. 1a.

FIG. 1b is a block diagram of certain elements of the preferred embodiment. The power supply 130 provides power to the camera 120, the circuit board 160, the associated controller 210 and display 140. Power switch 214 turns the supply of power on or off. Slider switch 212 controls the electromechanical zoom on the camera 120 zoom lens and the electronic zoom of the video processor 160 when the magnification range of the electromechanical zoom is exceeded. The controller 210 gives instructions to the camera 120, or to the portion of the circuit board that functions as a video processor, or both. The output of the camera 120 is fed to the portion of the circuit board that functions as a video processor, which may be analog, but is preferably digital. The processed output is fed from circuit board 160 to display 140.

Figure 2:
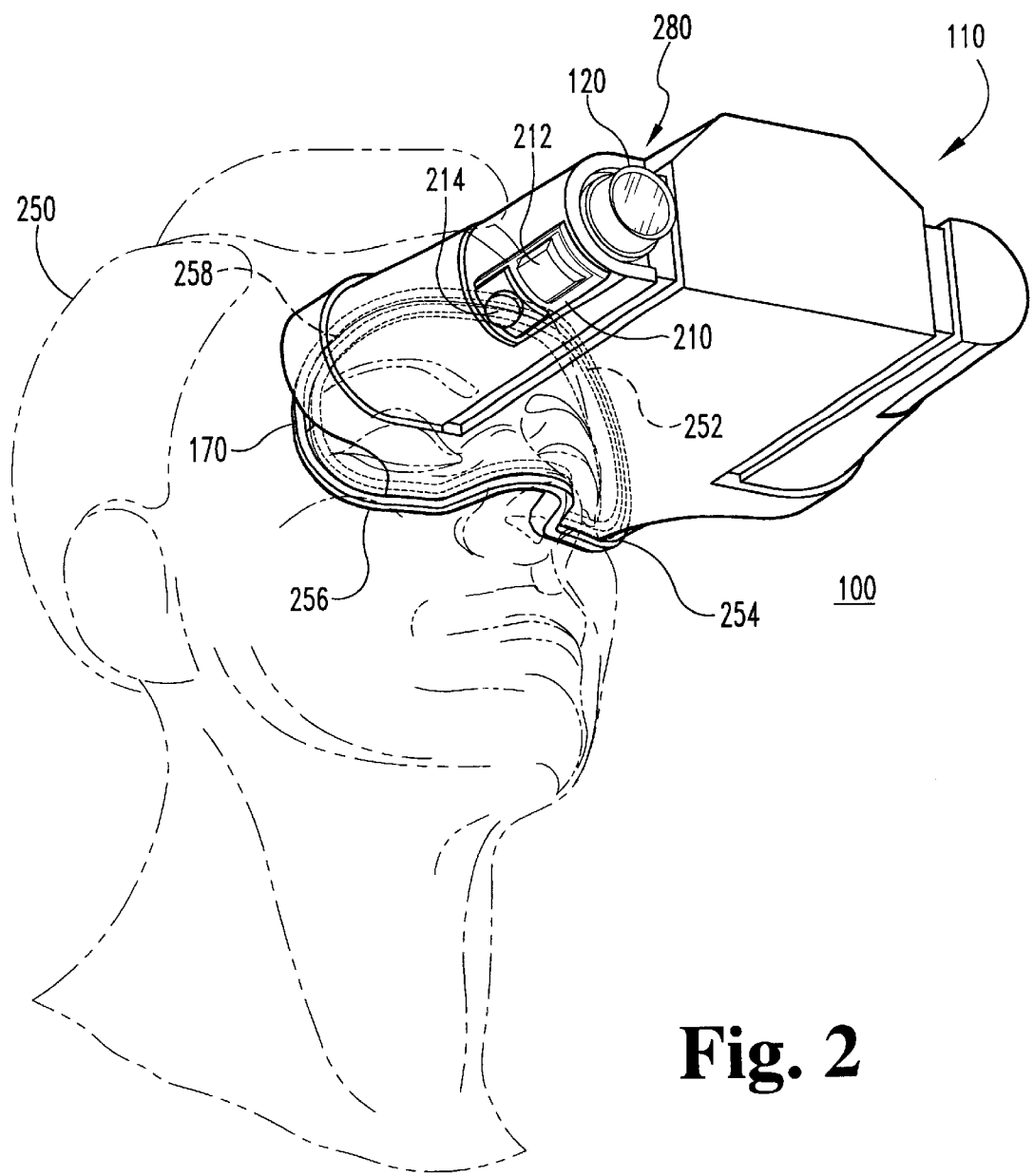
FIG. 2 is a bottom three-quarters perspective view of the electronic binoculars of FIG. 1 positioned for use against the face of a user.

FIG. 2 shows the binoculars 100 in contact with a face 250 of a user. The contact portion 170 is preferably shaped to make contact with the face 250 over a relatively large surface area, in order minimize the pressure at the points of contact even while the binoculars 100 are held firmly in place. Moreover, the spacing within the rear of the binoculars preferably provides room for the user's eyeglasses, while at the same time preferably providing substantial shading from external light. While the binocular casing is preferably substantially rigid as it extends toward the contact portion 170, the contact portion 170 itself is preferably partially soft or flexible, particularly at its rear edge, in order maximize the user's comfort. The contact portion can advantageously be made of rubber, soft foam core, soft plastic, or other such materials. The contact portion 170 is preferably shaped to make contact only outside the eye sockets.

The contact portion 170 makes contact above (such as points 252 and 258) and below (such as points 254 and 256), and preferably to the left and right of the user's eyes, in order to keep the binoculars at a constant position and attitude relative to the user's face. As shown, this contact preferably has a continuous strip above the eyes and two strips below the eyes on each side of the nose, in order to comfortably minimize the amount of small, undesired movement of the binoculars relative to the user's head.

As can be seen in FIG. 2, in the preferred embodiment, the contact portion 170 forms a hood around the eyes of a user. Preferably, at least a portion of the hood extends rearward a distance at least twice the height of the convex lens 150, as can be seen in FIG. 1. Preferably, the horizontal center of the top of the hood extends rearward from the proximal aperture at least a distance which is as great as the height of the aperture.

Preferably, controls 210 are located on the underside of the body 110, where the user can operate them with thumbs while comfortably holding the binoculars 100 in place. In one embodiment, controls 210 include a slider 212 for continuously adjusting the displayed image from larger to smaller view, and vice versa, by both control of the mechanical zoom of the camera or control of electronic magnification of the video processor. In another embodiment, controls 210 include a button 214 for activating the display 140, the camera, or both. In one form of this embodiment, the button acts as a dead-man switch, automatically deactivating the display 140 when it is not depressed to conserve power. In other embodiments, controls 210 include other mechanisms with which to select or adjust the output of display 140. In certain other embodiments, controls 210 are located in other positions on the body 110. In one such embodiment, not shown, the button 214 is located on the top of body 110 to be operated by the user's fingers when the binoculars are held against the user's face. Additionally, the incorporation of image stabilization techniques developed for steady images in electronic cameras could be incorporated in the binoculars, if desired.

Figure 3:
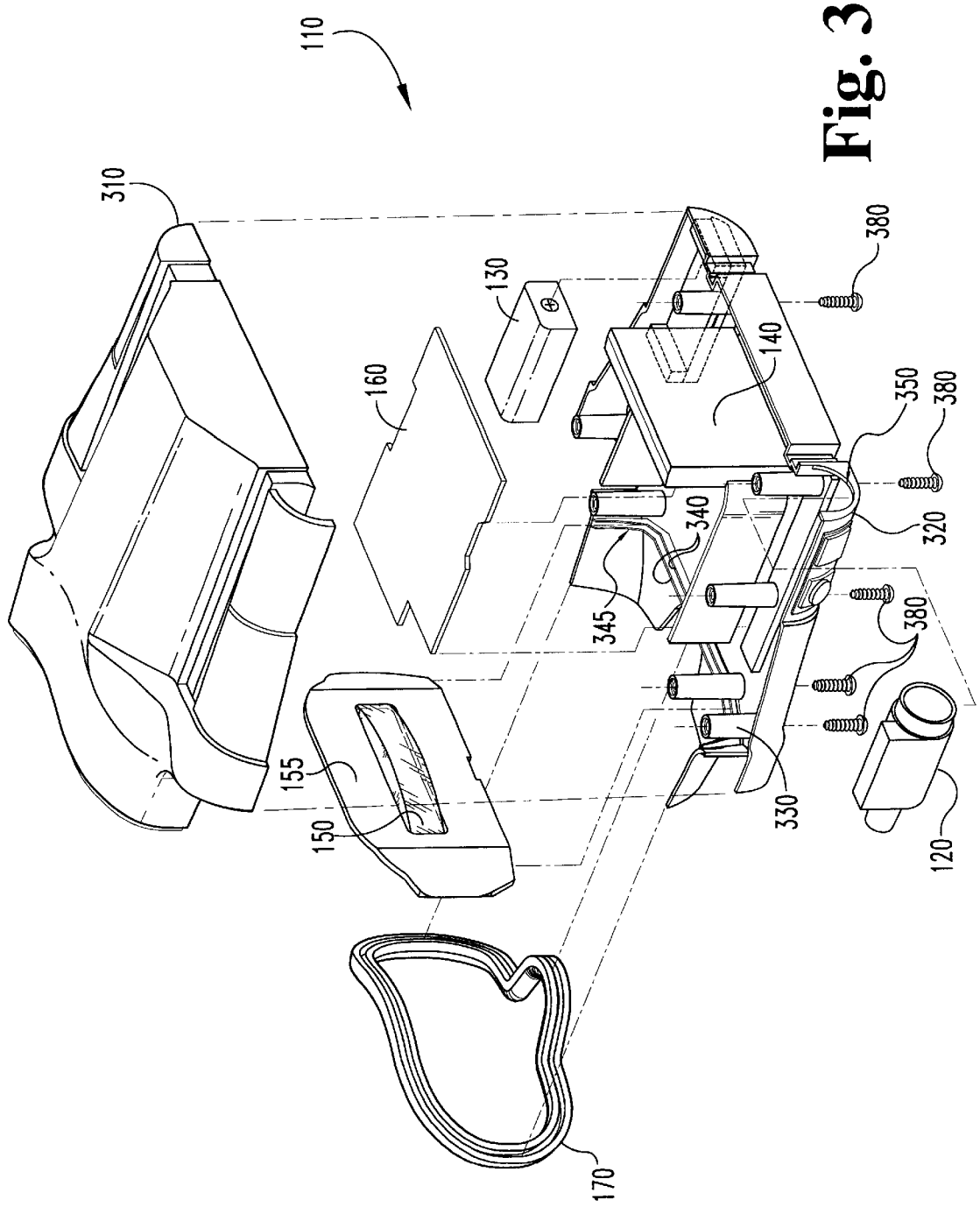
FIG. 3 is an exploded three-quarters perspective view of the electronic binoculars of FIG. 1.

FIG. 3 shows further details of the assembly of the preferred embodiment. The body 110 preferably comprises an upper portion 310 and a lower portion 320, in order to permit access to the interior. In one embodiment, the lower portion 320 has a number of upwardly projecting pylons 330 adapted to receive screws 380 from the exterior side of lower portion 320. In this embodiment, the upper portion 310 is adapted to receive the screws 380, so that they hold the upper portion 310 and the lower portion 320 together. In certain embodiments, upper portion 310 is affixed to lower portion 320 with interlocking lips located where the upper portion 310 and the lower portion 320 meet, such as are known in the art. Other means known in the art of affixing portions of a hollow body may also be used. Alternatively, the body may be made in a unitary fashion.

When the upper portion 310 and the lower portion 320 are assembled, the body 110 defines at least the distal aperture 280 and the proximal aperture 180. In certain embodiments, the distal aperture 280 is defined by a portion of the lip 350 of the lower portion 320 which does not make contact with the upper portion 310. The contact portion 170 can advantageously be formed as a single piece with a central aperture, and is preferably affixed to the upper portion 310 and the lower portion 320 after they are affixed to each other, positioned such that when the contact portion 170 is placed in contact with the user's face at points above and below the user's eyes, on both the left and right sides of the face, the view into the proximal aperture 180, to the display 140 is unobstructed. Alternatively, contact portion 170 can be formed from separate parts integral to the upper portion 310 and the lower portion 320.

In the preferred embodiment, the camera 120 is positioned to observe the external environment through the distal aperture 280. The distal aperture 280 is preferably on the opposite side of the body from the proximal aperture 180, and the camera 120 is preferably directed generally along the axis between them and to observe the external environment through the distal aperture 280. However, the proximal aperture 180 can be located anywhere on the body 110, and the camera 120 can be directed in any direction so long as it can observe the external environment. In certain embodiments not shown, camera 120 is mounted to the exterior of the body 110, and the distal aperture 280 provides access for electronic communication between the camera 120 and the circuit board 160.

In the preferred embodiment, the portion of the body 110 defining the proximal aperture 180 has a pair of lips 340 defining a track 345 shaped to receive the frame 155, so that the lens 150 is held in place between the user's eyes and the display 140. In certain other embodiments not shown, the frame 155 is integral to one of the upper portion 310 or the lower portion 320. Alternatively, any means of holding the lens 150 in a constant position relative to the body 110 can be used. In the preferred embodiment, the lens 150 is positioned such that when contact portion 170 is placed in contact with the user's face, the distances between the user's eyes and the lens 150, and between the lens 150 and the display 140 has a ratio greater than about 1 to 10 and less than about 1 to 2.

When in use, power supply 130 provides power to camera 120 and to circuit board 160. Circuit board 160 optionally includes a subsidiary power supply, or other means of regulating the power supplied by power supply 130, or both. The camera 120 images the objects or scenery towards which the binoculars 100 are directed. The circuit board 160 is designed to transmit the signal from camera 120 to display 140 to cause display 140 to reproduce the object or scenery imaged by camera 120.

Preferably, circuit board 160 is also designed to respond to controls 210 to selectively modify the signal from camera 120 to cause the output of display 140 to vary in one or more predefined ways. More specifically, for example, to cause display 140 to display a portion, with a size selected by the slider 212, of the image observed by camera 120, with that portion correspondingly enlarged to fill the entire display 140. In the preferred embodiment, circuit board 160 is designed to perform an electronic variable zoom, by modifying the signal from camera 120 to cause display 140 to display a portion, with a size selected by the slider 212, of the image observed by camera 120, with that portion correspondingly enlarged to fill the entire display 140. The user holds the contact portion 170 to the face 250, and views the display 140 through lens 150, using controls 210 to adjust the image as desired.

It will be appreciated that, due to the lightweight materials used, and the relatively small number of optical elements, the preferred embodiments of the present invention can be made substantially lighter than the typical binoculars.

Specifically, certain preferred embodiments of the present invention weight less than three pounds.

While the invention is shown in its preferred form with a single display viewed through a single lens, it would be possible to have other arrangements. For example, one could locate the camera in the center of the binoculars, above or below the display, rather than at the side. As another example, one could use a mirror or mirrors, rather than a lens, to direct the vision of the user to the single display, which would then have is image electronically reversed, right to left, and being displayed forward, rather than rearward.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. Electronic binoculars for a user having a face and eyes, the binoculars comprising:
    a body comprising:
        a proximal aperture in said body which is at least 4 centimeters wide, a substantially rigid hood substantially encircling the space rearward of said proximal aperture and substantially encircling the space forward of both of said user's eyes and substantially all area between said user's eyes when in contact with the user's face;
        an electric imaging display device within said body positioned so that one eye of the user can simultaneously view substantially the same portion of said display device that the other eye is viewing through said proximal aperture when the user places said hood element against the user's face, said electric imaging display device being further positioned so that a path exists between each of said user's eyes and a common portion of said display device, said path including no reflective optical elements, and
        an electronic camera mounted to said body and having an output connected to said electric imaging display device.

2. The electronic binoculars of claim 1 which additionally includes a distal aperture in said body, and said electronic camera obtains its image through said distal aperture.

3. The electronic binoculars of claim 1 in which said electronic camera output connects only to said electric display device and not to an external connector, external jack, another image display or a recording device.

4. Electronic binoculars for a user having a face and eyes, the binoculars comprising:
    a body comprising:
        a proximal aperture in said body,
        a convex lens in said proximal aperture, and
        a hood extending rearward of said proximal aperture, and at least a portion of said hood extending rearward a distance at least twice the height of said convex lens in said proximal aperture,
    an electric imaging display device positioned within said body so a path exists between each of said user's eyes and a common portion of said display device, said path including no reflective optical elements, when said user places said hood against said user's face, and
    an electronic camera mounted to said body and having an output connected to said display device.

5. The electronic binoculars of claim 4 in which there is only one proximal aperture.

6. The electronic binoculars of claim 4, further comprising electronic circuits adapted to make modifications to said camera's output, said circuits being in electronic communication with said camera and said display device.

7. The electronic binoculars of claim 6, further comprising a controller affixed to said body and adapted to permit said user to adjust said modifications to said camera's output performed by said electronic circuits.

8. The electronic binoculars of claim 7, in which said controller comprises a button.

9. The electronic binoculars of claim 7, additionally comprises an electro-mechanical zoom mechanism on said camera and in which said controller acts to control said zoom mechanism.

10. The electronic binoculars of claim 4 in which said hood of said binoculars has a partially soft or flexible rear edge, in order maximize the user's comfort.

11. The electronic binoculars of claim 4 in which the horizontal center of the top of said hood extends rearward from said proximal aperture at least a distance which is as great as the height of said aperture.

12. The electronic binoculars of claim 11 in which a portion of said hood extends rearward from said proximal aperture at distance of at least about twice the height of said aperture.

13. The electronic binoculars of claim 4 in which the proximal aperture is large enough to encompass the path of vision of both eyes toward said display device when the binoculars are placed against the users face.

14. The electronic binoculars of claim 4 in which the proximal aperture contains a convex lens.

15. The electronic binoculars of claim 14 in which said convex lens is convex about only one of three orthogonal reference axes.

16. The electronic binoculars of claim 15 in which said convex lens is convex about a vertical axis.

17. The electronic binoculars of claim 16 in which said proximal aperture is substantially rectangular.

18. The electronic binoculars of claim 4 in which said proximal aperture is at least 4 centimeters wide.

19. The electronic binoculars of claim 18 in which said proximal aperture is substantially rectangular.

20. The electronic binocular of claim 4, further comprising a distal aperture, and in which said camera images through said distal aperture.

21. The electronic binoculars of claim 4 in which said electronic camera output connects only to said display device and not to an external connector, external jack, another image display or a recording device.

22. Electronic binoculars for a user having a face and eyes, the binoculars comprising:
    a body comprising:
        a proximal aperture in said body, and
        an electric imaging display device within said body positioned so that a path exists between each of said user's eyes and a common portion of said display device, said path including no reflective optical elements, when said user places said body against said user's face, and
        an electronic camera coupled to said body and having an output connected to said display device.

23. The electronic binoculars of claim 22 in which there is only one proximal aperture.

24. The electronic binoculars of claim 23 in which said proximal aperture is at least 4 centimeters wide.

25. The electronic binoculars of claim 24 in which said proximal aperture is rectangular.

26. The electronic binoculars of claim 25 in which said proximal aperture contains a lens which is at least 4 centimeters wide.

27. The electronic binoculars of claim 26 in which said lens is convex about only one of three orthogonal axes.

28. The electronic binoculars of claim 22 which additionally comprises an electromechanical zoom mechanism on said camera, a distal aperture in said body, and said camera is mounted within said body in a position to image through said distal aperture.

29. The electronic binoculars of claim 22 in which said electronic camera output connects only to said display device and not to an external connector, external jack, another image display or a recording device.

30. Electronic binoculars for a user having a face and eyes, the binoculars comprising:
   a body having at least one proximal aperture and a distal aperture,
   an electric display device for producing an image within said body, said electric display device being positioned so that a path exists between each of said user's eyes and a common portion of said display device, said path including no reflective optical elements, when said user places said body against said user's face, and
   an electronic camera with an output connected only to said electric display device and positioned to image through said distal aperture, and
   the electronic binoculars weighing less than 3 pounds.

* * * * *